United States Patent
Wehler

[19]
[11] Patent Number: 6,161,372
[45] Date of Patent: Dec. 19, 2000

[54] ENERGY SUPPLY CHAIN WITH EXTRA TOUGH CORE CHAIN LINKS AND METHOD FOR THE PRODUCTION OF ONE SUCH CHAIN LINK

[75] Inventor: Herbert Wehler, Neunkirchen, Germany

[73] Assignee: Kabelschlepp GmbH, Siegen, Germany

[21] Appl. No.: 09/380,166

[22] PCT Filed: Feb. 9, 1998

[86] PCT No.: PCT/EP98/00704

§ 371 Date: Sep. 22, 1999

§ 102(e) Date: Sep. 22, 1999

[87] PCT Pub. No.: WO98/38440

PCT Pub. Date: Sep. 3, 1998

[30] Foreign Application Priority Data

Feb. 27, 1997 [DE] Germany .......................... 197 07 966

[51] Int. Cl.[7] .................................................. F16G 13/16
[52] U.S. Cl. .............................. 59/78.1; 59/900; 249/49; 249/75
[58] Field of Search ................... 59/78.1, 900; 248/49, 248/51, 75

[56] References Cited

U.S. PATENT DOCUMENTS

| | | |
|---|---|---|
| 3,646,752 | 3/1972 | Kampfer . |
| 4,590,961 | 5/1986 | Schumann . |
| 4,625,507 | 12/1986 | Moritz et al. . |
| 4,852,342 | 8/1989 | Hart ........................................ 59/78.1 |
| 5,016,841 | 5/1991 | Schumann et al. ...................... 59/78.1 |
| 5,642,612 | 7/1997 | Hughes ................................... 59/78.1 |
| 5,829,243 | 11/1998 | Hughes ................................... 59/78.1 |
| 6,029,437 | 2/2000 | Hart ........................................ 59/78.1 |

FOREIGN PATENT DOCUMENTS

| | | |
|---|---|---|
| 0 154 882 | 9/1985 | European Pat. Off. . |
| 31 21 912 | 12/1982 | Germany . |
| 36 19 049 | 2/1987 | Germany . |
| 36 05 382 | 8/1987 | Germany . |
| 38 04 987 | 12/1989 | Germany . |
| 89 13 176 U | 3/1990 | Germany . |
| 39 28 236 | 10/1990 | Germany . |
| 1 149 341 | 4/1969 | United Kingdom . |

*Primary Examiner*—David Jones
*Attorney, Agent, or Firm*—Alston & Bird LLP

[57] ABSTRACT

To increase the self-supporting lengths and to achieve a higher load-bearing capacity for an energy guide chain, there is proposed a chain link which has two spaced-apart, mutually oppositely disposed, plate-shaped chain link portions (9) and at least one transverse portion connected to the chain link portions (9). At least one chain link portion (9) has a core (1). The core (1) is enclosed by a core sheathing (10). The core (1) is such that it has a higher level of strength than the core sheathing (10). It is proposed that the core (1) comprises a metallic material. The core sheathing comprises a plastics material.

22 Claims, 8 Drawing Sheets

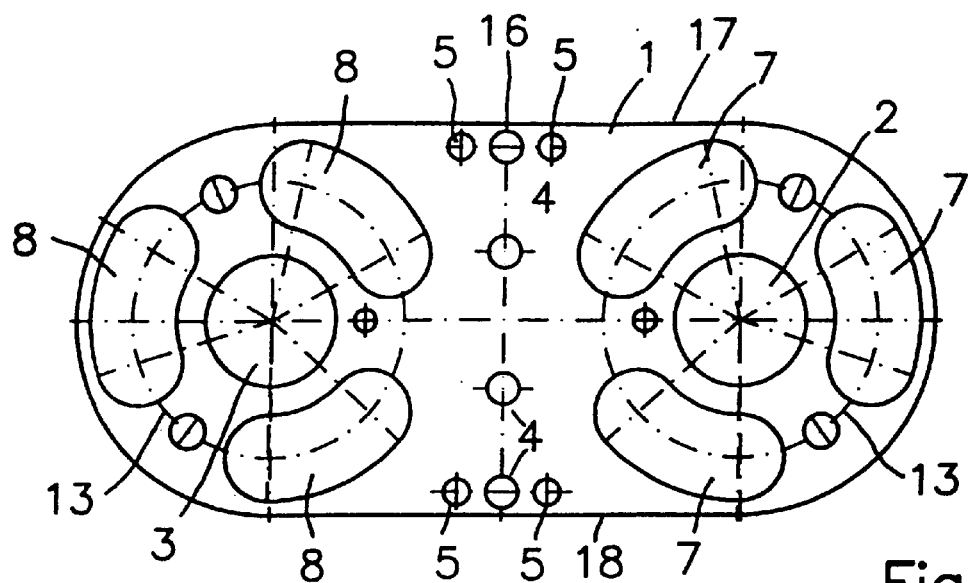
Fig.1
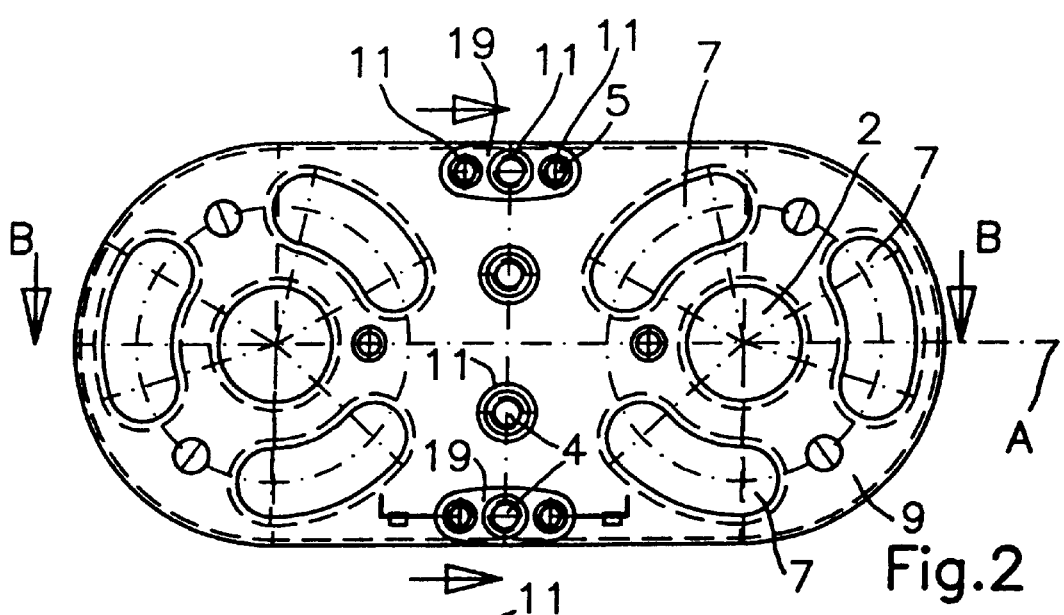
Fig.2
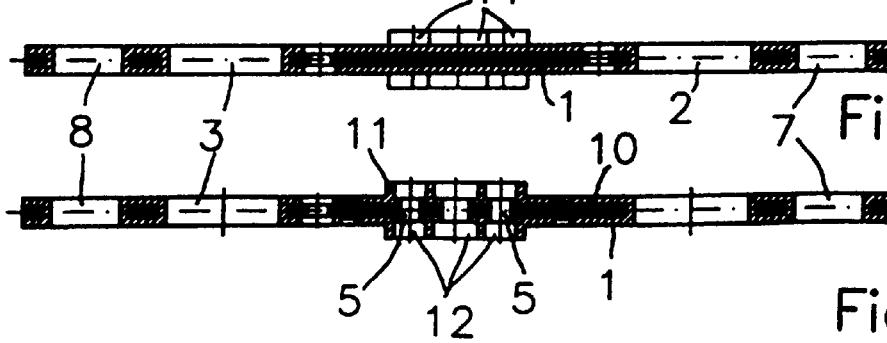
Fig.3
Fig.4

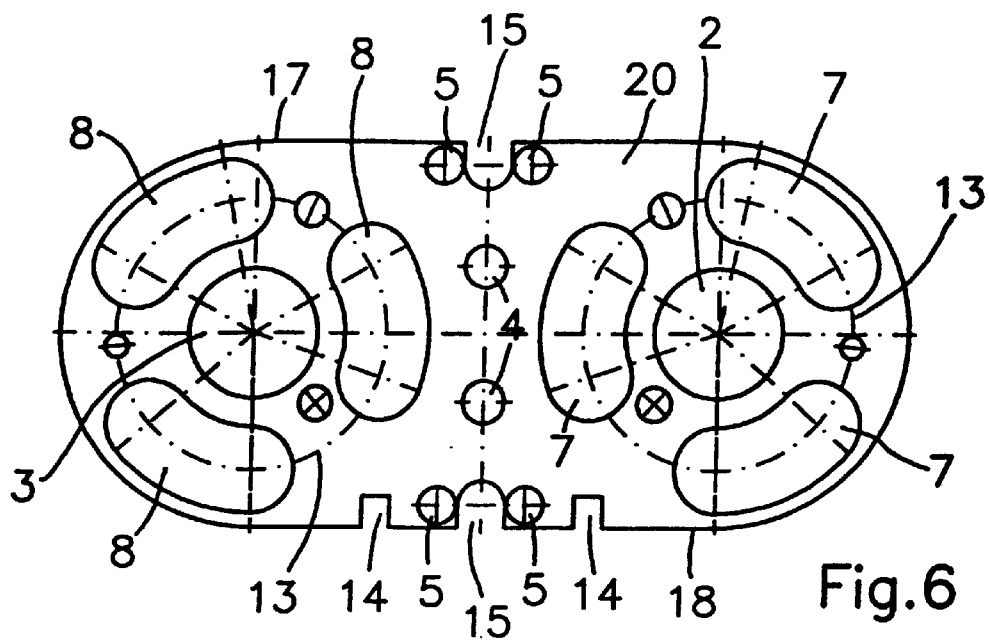
Fig.6
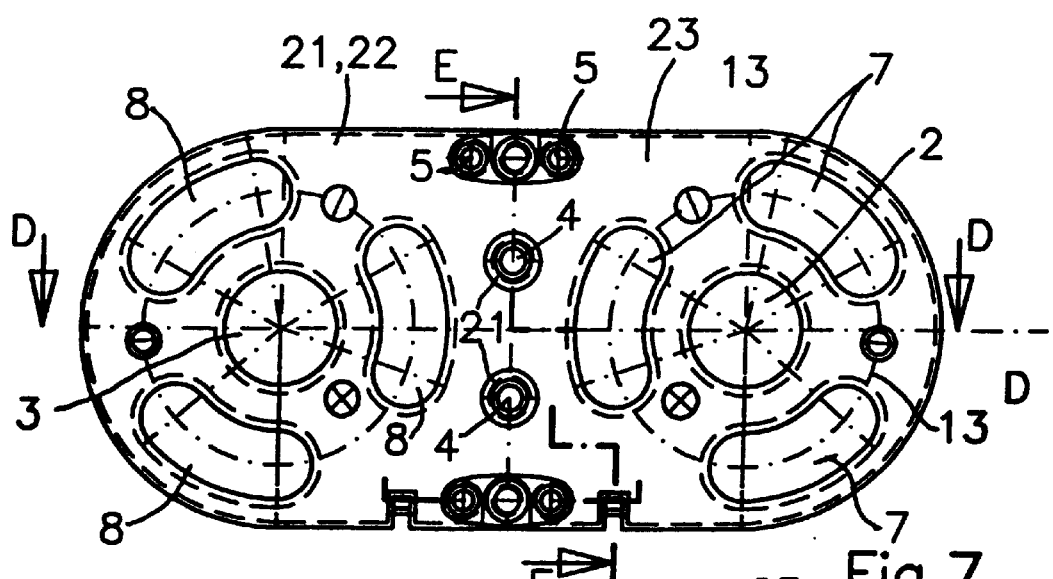
Fig.7
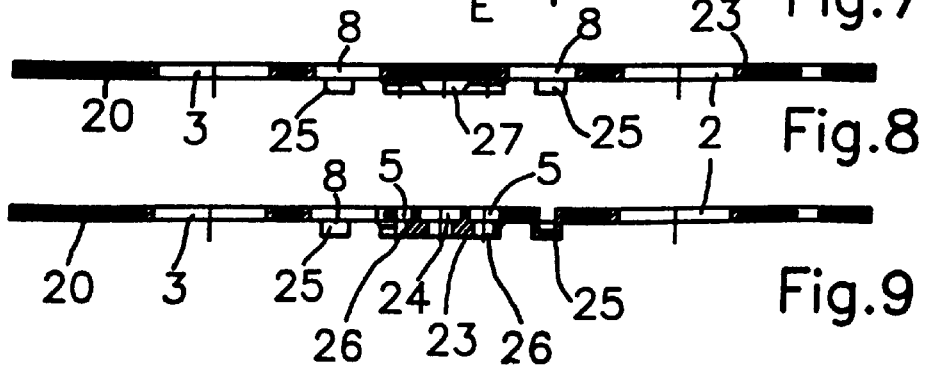
Fig.8
Fig.9

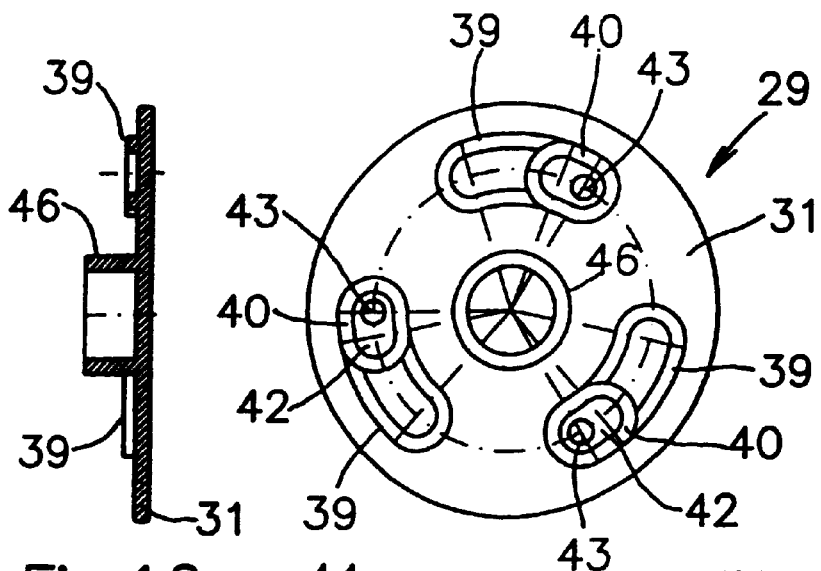
Fig.16    Fig.14
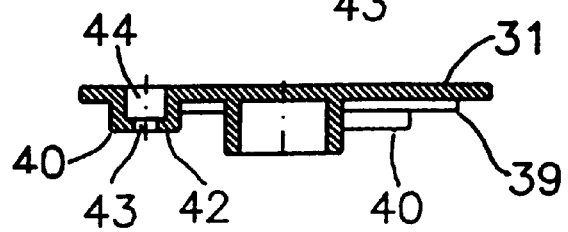
Fig.15
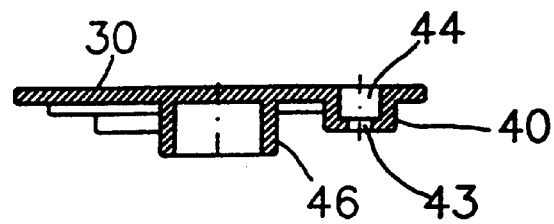
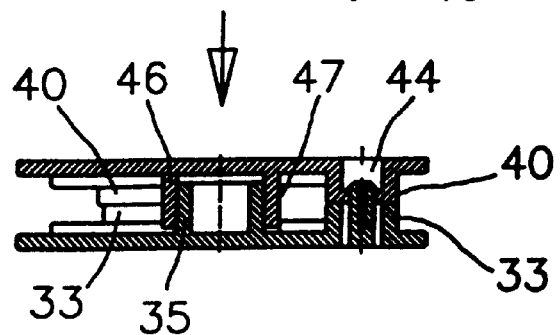
Fig.17
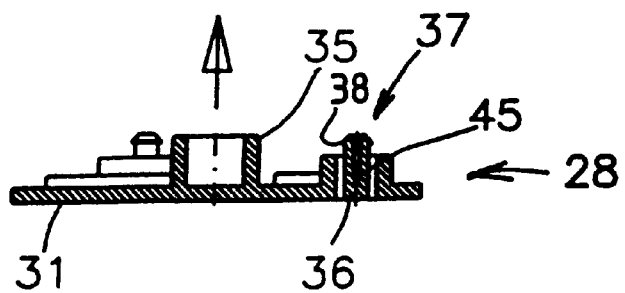

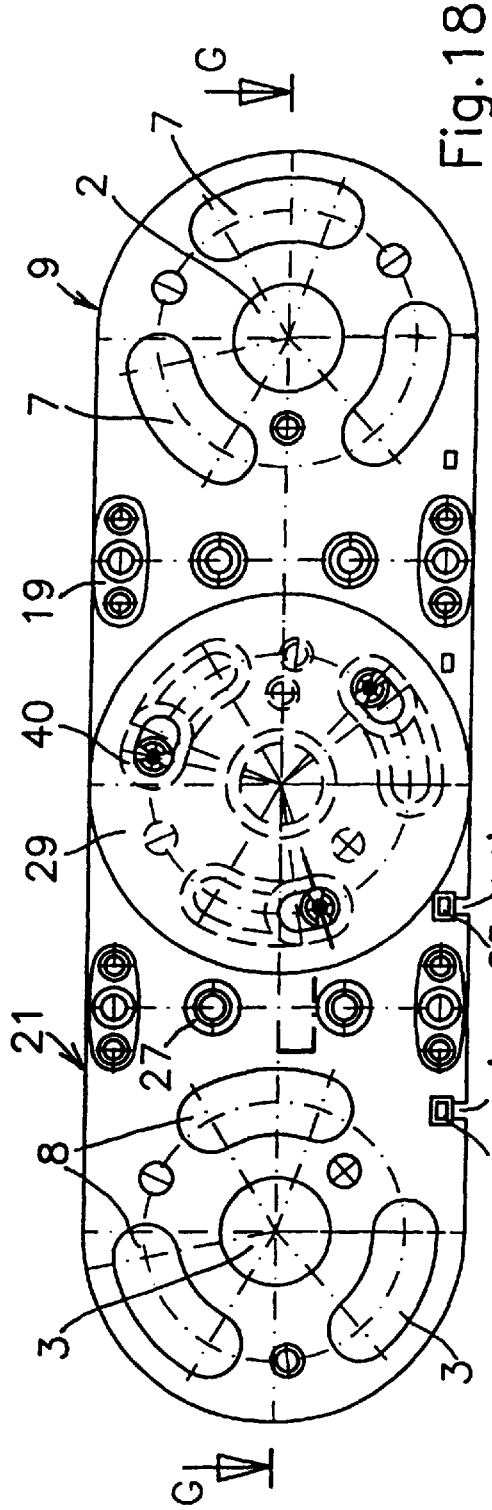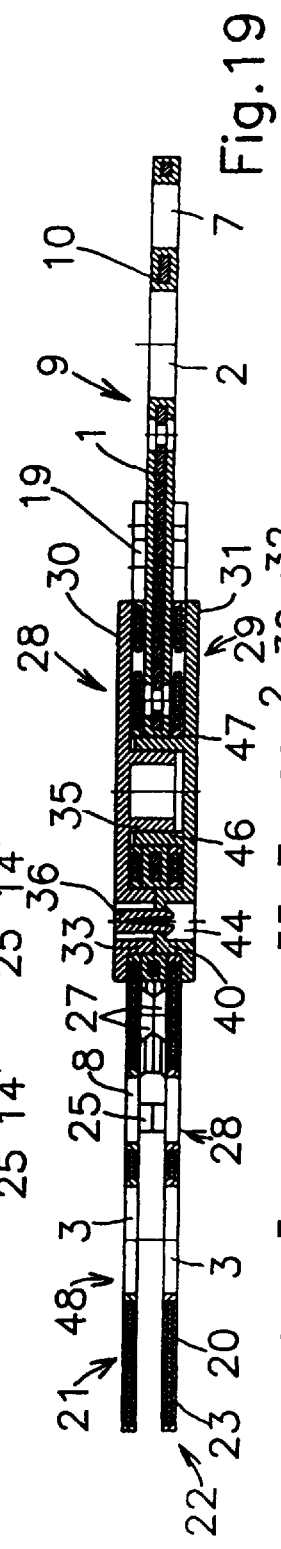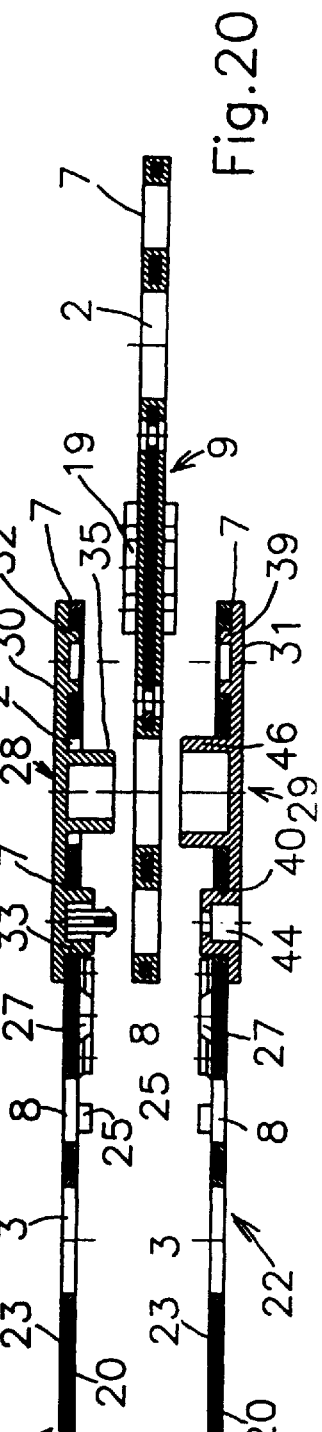
Fig. 18
Fig. 19
Fig. 20

ENERGY SUPPLY CHAIN WITH EXTRA TOUGH CORE CHAIN LINKS AND METHOD FOR THE PRODUCTION OF ONE SUCH CHAIN LINK

BACKGROUND OF THE INVENTION

The invention concerns a chain link, in particular for energy guide chains, a process for the production of a chain link and an energy guide chain.

It is known to use so-called energy guide chains for guiding supply lines from a stationary connection to a movable connection. The energy guide chains are formed by chain links which are hingedly connected together. The chain links define a receiving space in the energy guide chain, in which the supply lines are laid. The supply lines may be for example electrical lines, compressed air lines or hoses.

It is known that the chain links are made from a metal material. Metal energy guide chains of that kind primarily involve special chains which are used in selected areas.

Energy guide chains are also known in which the chain links thereof are made from a plastics material. Energy guide chains with plastics chain links have the disadvantage in comparison with the known energy guide chains comprising a metal material that a self-supporting length of a plastics energy guide chain is less, in comparison with metal chains. That problem is already known. EP 0 154 882 B1 discloses an energy guide chain of plastics material, which, for relatively large line weights and/or self-supporting lengths, in addition to mutually contacting surfaces between a pivot bore and a pivot pin, slots and abutment pins, also has a support means between a comparatively large surface at the outside edge of a structure and in the inside edge a receiving means for the adjacent chain links.

The present invention is based on the problem of providing a chain link, in particular for energy guide chains for guiding supply lines, which is also capable of withstanding high loadings. A further aim of the invention is to provide an energy guide chain which permits long self-supporting lengths. A further aim of the invention is to provide a process by which chain link portions for chain links can be easily and reliably produced.

SUMMARY OF THE INVENTION

The chain link according to the invention, in particular for energy guide chains for guiding supply lines, has two spaced-apart, mutually oppositely disposed, plate-shaped chain link portions and at least one transverse portion which is connected to the chain link portions. The chain link is distinguished in that at least one chain link has a core and a core sheathing which at least partially encloses the core, wherein the core is such that it is of greater strength than the core sheathing. This configuration in accordance with the invention of the chain link provides for a functional separation of the chain link. While the core of the chain link essentially determines the strength of the chain link the core sheathing which encloses the core performs other functions, for example provides for movement of the chain with a small amount of noise.

The core of the chain link preferably has at least one macroscopic structure which is of high mechanical strength. In that respect it is preferred for the configuration of the core to be in the form of a honeycomb structure. Honeycomb structures are of relatively high mechanical strength, by virtue of their configuration. A further advantage of a honeycomb structure as a core can be seen in the fact that the weight of a chain link is reduced.

Instead of or in addition to a structurally advantageous configuration of the core which has a high mechanical strength, the strength of the core can be increased relative to the core sheathing by a suitable choice of material. Thus it is proposed for example that the core comprises at least a first material which has a higher level of strength and in particular a greater modulus of elasticity than a second material of the core sheathing.

Preferably the core comprises at least a material which in comparison with at least a second material of the core sheathing has a modulus of elasticity which is at least five times and preferably ten times as great.

In accordance with a further advantageous concept it is proposed that the core is of a multi-layer structure. The structure is preferably formed by at least two layers of different materials. That provides a core in the form of a laminate which has a high level of strength by virtue of a suitable choice of material.

A preferred embodiment of the chain link is one in which the core at least partially comprises at least a metallic material. The core is preferably produced in part from a light metal or alloy, in particular aluminium or an aluminium alloy. In comparison with the glass fibre-reinforced plastics chain links which were normally used hitherto, the modulus of elasticity of such a core is about ten times higher. That will impart a high level of strength to the chain link. On the other hand, when a light metal or alloy is used as the core for a chain link, only a slight increase in weight is involved.

To provide for a further increase in the load-carrying capacity of the chain links, it is proposed that the core at least partially comprises steel or a steel alloy. Preferably the core is made in one piece. The core can be stamped out of a metal plate.

In accordance with a further advantageous development it is proposed that the core sheathing completely encloses the core. That configuration simultaneously provides a certain protective coating for the core. If an energy guide chain which is made up from the chain links according to the invention is used in an aggressive atmosphere, no damage to the core occurs. Preferably the core sheathing is formed from at least one plastics material. The use of a plastics material as the core sheathing also affords the advantage that there is no excessive production of sound during operation of the energy guide chain if chain link portions comprise a metallic material. By virtue of a suitable choice of plastics materials, the chain links can be used to make up an energy guide chain which is adapted to the purpose of use involved.

Preferably the configuration of the core substantially corresponds to a shape of a chain link portion.

In accordance with another concept of the present invention, there is proposed a process for the production of a plate-shaped chain link portion of a chain link, in particular a chain link of the energy guide chain for guiding supply lines, preferably for a chain link as described above, wherein a plate-shaped core of a chain link is formed and the core is provided with a core sheathing which at least partially encloses same, wherein the core is such that it has a higher degree of strength than the core sheathing. Preferably the core is formed from at least a first material which has a higher level of strength and in particular a greater modulus of elasticity than at least a second material of the core sheathing.

By virtue of the fact that firstly the core which determines the strength of the chain link is formed and then the core is enclosed by a core sheathing, the plate-shaped chain link portions and thus the chain links can also be adapted to different functions to be performed by an energy guide chain. The sliding properties of the chain link on a support can be positively influenced by a suitable choice of material for the core sheathing. Furthermore the core sheathing can form a protective coating which is resistant to aggressive agents. That increases the variation of uses to which an energy guide chain can be put. The production of such plate-shaped chain link portions and therewith also the chain links is also positively influenced from the point of view of economy as the core can comprise a high-strength material which is inexpensive. It is no longer necessary for the entire chain link to be made from an expensive material which for example must be resistant to the ambient atmosphere.

Production of the core also includes the formation of bores, openings or the like before the core is provided with a core sheathing. That ensures that the core is completely enclosed by the core sheathing.

A preferred process is one in which the core is separated out of a starting material, in particular a metallic material. The core is separated out of the starting material in particular by stamping. Stamping represents a working process which does not involve chip formation and which can be implemented easily and at relatively low cost. All necessary openings can also be simultaneously formed in the core with the stamping procedure. When dealing with more complicated contours and configurations for the core, it may be desirable to form given openings in the core prior to or after a stamping operation or the like.

In accordance with a further concept of the invention there is proposed an energy guide chain having at least one chain link as described above, wherein each plate-shaped chain link portion has two spaced-apart pivot bores which extend transversely with respect to the longitudinal extent of the chain link and each of which is surrounded by at least one arcuate opening. At least one connecting portion of plastics material is proposed for connecting the adjacent chain links. The connecting portion has at least one positioning element which projects into the opening in the chain link. The outside contour of the positioning element is such that the connecting portion is fixed to the chain link portion by the positioning element, whereby relative movement between the connecting portion and the chain link portion is prevented. The connecting portion also has at least one abutment element which projects into an opening in a chain link portion of an adjacent chain link. The configuration of the abutment element and the opening defines an angle of pivotal movement of the adjacent chain links about a common pivot pin which extends through the pivot bores of the chain link portions. The fact that the connecting portion constitutes a separate component provides that the connecting portion can be relatively easily replaced due to wear phenomena when very high levels of loading are involved. The wear of the chain links in the region of the pivot connections is also reduced by virtue of the connecting portion of plastics material. The structure in principle of such an energy guide chain is known from DE 36 19 049 A1.

In accordance with a further advantageous concept it is proposed that, in an energy guide chain, a chain link which has one-piece chain link portions is followed by a chain link whose chain link portions are formed by an inner plate and an outer plate, wherein the one-piece chain link portion is arranged between the inner and outer plates. In order to ensure that the inner plate and the outer plate are always at a constant spacing relative to each other in operation of the energy guide chain, it is proposed that spacers are provided between the inner plate and the outer plate. The spacers can be provided on the inner plate and/or the outer plate.

For connecting the adjacent chain links of an energy guide chain it is proposed that there are provided two connecting portions. Each connecting portion has at least one positioning element which projects into the opening in the inner plate or the outer plate and at least one abutment element which partially projects into the opening in the one-piece chain link portion. Preferably the connecting portions are latchable to each other. To provide for the latching connection of the connecting portions, it is proposed that the abutment elements of the one connecting portion have receiving means and the abutment elements of the other connecting portion have retaining elements which engage into the receiving means.

BRIEF DESCRIPTION OF THE DRAWINGS

Further advantages and details of the invention will be described by means of a preferred embodiment illustrated in the drawing in which:

FIG. 1 shows a metallic core of a chain link portion,

FIG. 2 shows a chain link portion having a core as shown in FIG. 1,

FIG. 3 is a plan view of the chain link portion in section along a central line A, FIG. 4 is a plan view of the chain link portion of FIG. 1 in section taken along section line B—B, FIG. 6 shows a core of a two-part chain link portion, FIG. 7 shows an inner plate or outer plate of a two-part chain link portion with a core as shown in FIG. 6, FIG. 8 shows a plan view of the inner or outer plate of FIG. 7 in section taken along the central line C, FIG. 9 is a plan view of the inner or outer plate shown in FIG. 7 in section taken along section line D—D, FIG. 14 is a front view of a second connecting portion, FIG. 15 is a plan view in full section of the second connecting portion, FIG. 16 is a side view in full section of the connecting portion shown in FIG. 14, FIG. 17 is a diagrammatic view in section of a connection of the connecting portions to each other, FIG. 18 shows an arrangement of adjacent chain link portions with connecting portions, FIG. 19 is a view in section taken along section line G—G in FIG. 18, FIG. 20 shows the arrangement of FIG. 19 in the released condition.

DETAILED DESCRIPTION OF THE PREFERRED EMBODIMENTS

Figure 5:
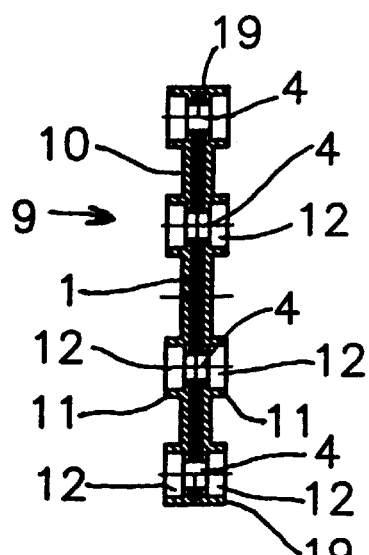
FIG. 5 shows a side view from the left in full section of the chain link portion shown in FIG. 1.

FIG. 1 shows a core 1 for a chain link portion. The core 1 comprises a metallic material. The core 1 is substantially of a plate-like configuration. The core 1 has two spaced-apart pivot bores 2, 3. The pivot bore 2 is surrounded by three arcuate openings 7 which are formed symmetrically on a notional circumference 13 of a circle. The notional circumference 13 is coaxial with the pivot bore 2. The pivot bore 3 is surrounded by three openings 8 which are of an arcuate configuration. The openings 8 are disposed symmetrically on a notional circumference 13 of a circle which is coaxial with the pivot bore 3. The core 1 is of a configuration presenting mirror-image symmetry with respect to the short center line 16. The longitudinal edges 17, 18 of the core 1 extends substantially perpendicularly to the short center line 16. Bores 4 are formed at spacings from each other on the center line 16. Provided in the region of the longitudinal edges 17, 18 are additional bores 5 which are disposed substantially on a line extending parallel to the longitudinal edge 17 and 18 respectively. A bore 4 is disposed between two bores 5.

FIG. 2 shows a chain link portion 9 with a core 1. FIGS. 3, 4 and 5 show sectional views of the chain link portion 9. As can be seen in particular from FIGS. 3, 4 and 5 the core 1 of the chain link portion 9 is completely enclosed by a core sheathing 10. The core sheathing 10 comprises a plastics material. The pivot bores 2, 3 and the openings 7, 8 in the chain link portion 9 are free.

Each bore 4, 5 is surrounded by a collar 11 extending therearound. Each collar 11 defines a head space 12 in which a screw head can be sunk, as can be seen in particular from FIG. 22 or FIG. 23. The collar 11 around the bores 5, 4, 5 which are disposed in mutually juxtaposed relationship is formed by a common projection 19.

FIG. 6 shows a core 20 for an inner or outer plate of a chain link portion. The structure in principle of the core 20 corresponds to the structure of the core 1 as is shown in FIG. 1. The core 20 has two pivot bores 2, 3 which are provided at a spacing relative to each other. The pivot bore 2 is surrounded by openings 7. The three openings 7 are formed symmetrically on a notional circumference 13 of a circle. The center point of the notional circumference 13 of the circle coincides with the center point of the pivot bore 2.

The pivot bore 3 is surrounded by three openings 8. The openings 8 are disposed on a notional circumference 13 of a circle and are distributed symmetrically thereon. The notional circumference 13 of the circle has a common center point with the pivot bore 3.

Two bores 4 are formed on the short center line 16. Recesses 14 extend from the longitudinal edge 18 towards the opposite longitudinal edge 17 and are disposed on both sides of and symmetrically relative to the short center line 16.

Figure 10:
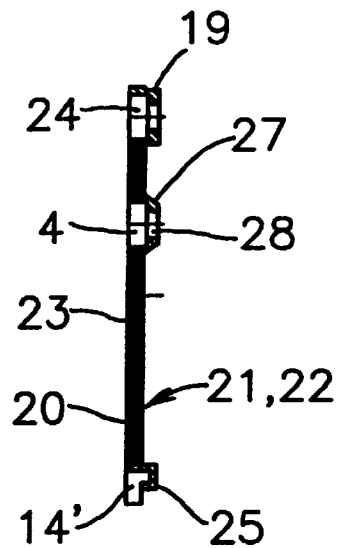
FIG. 10 is a side view of the inner or outer plate as viewed from the left along section line E—E.

FIG. 7 shows an inner or outer plate 21, 22 for forming a chain link portion. FIGS. 8, 9 and 10 show sectional views of the inner and outer plate 21, 22. The inner or outer plate 21, 22 has a core 20 which corresponds to the core as shown in FIG. 6. The core 20 is completely enclosed by a core sheathing 23. In the region of the original recesses 14 in the core 20 the inner or outer plate 21, 22 has a recess 14' having a holder 25 which projects out of the plane. The holder 25 is of a hook-shaped cross-section. The bores 5 are each surrounded by a respective spacer portion 23 which has holes 26 extending coaxially with respect to the bores 5. A through opening 24 is formed in the region of the opening 15 in the core 20. Formed in the region of the bores 4 are spacer portions 27 each having an opening 28 communicating with the respective bore 4. FIG. 10 shows that the end faces of the projection 19, the spacer portion 27 and the holder 25 lie in a common plane which extends parallel to the plate-shaped core 20. The overall thickness of the inner or outer plate 21, 22 corresponds to half the thickness of the chain link portion 29 as can be seen in particular from FIG. 5. FIGS. 5 and 10 show that the core 1 of the chain link portion 9 is thicker than the core 20 of the inner or outer plate 21, 22.

Figure 13:
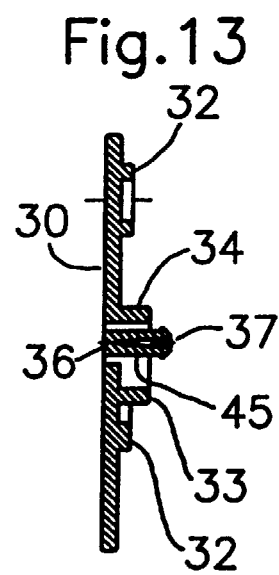
FIG. 13 is a side view from the left of the connecting portion in section taken along line F—F.
Figure 11:
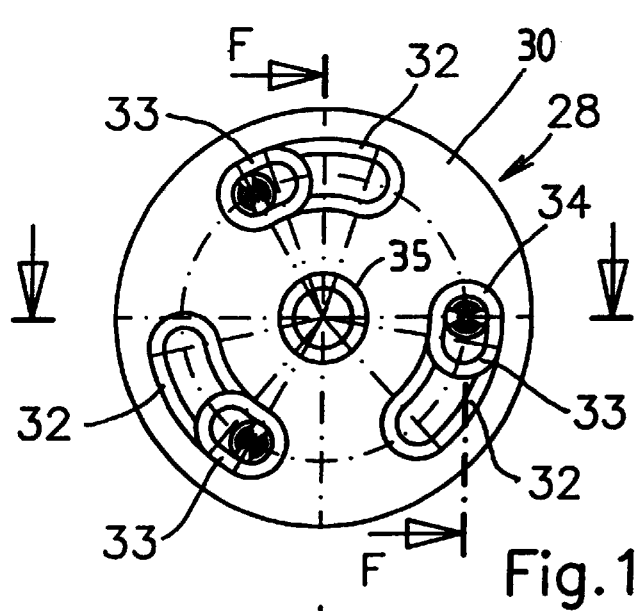
FIG. 11 is a front view of a first connecting portion.
Figure 12:
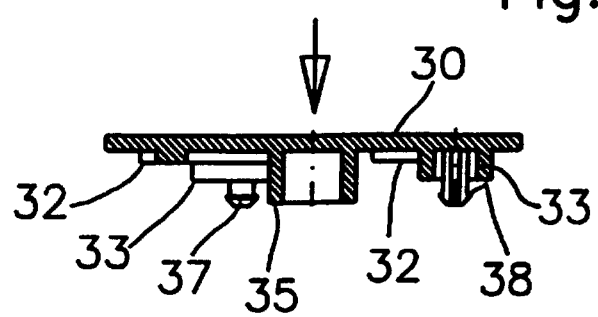
FIG. 12 is a plan view in section of the connecting portion.

FIGS. 11 to 13 show a first connecting portion 28. The connecting portion 28 has a disc-shaped carrier 30. The diameter of the disc-shaped carrier 30 substantially corresponds to the width of the chain link portion. Positioning elements 32 are formed symmetrically on a circumference of a circle on the carrier 30. The positioning elements 32 are arcuate in shape. The outside contour of the positioning elements 32 substantially corresponds to the inside contour of the openings 7, 8. The carrier 30 further has abutment elements 33 which extend over a part of the length as considered in the peripheral direction of the positioning elements 32. As can be seen in particular from FIG. 11 and FIG. 13 the abutment elements 33 and the positioning elements 32 partially have a common wall 34. The abutment elements 33 are greater in height than the positioning elements 32. The height of the positioning elements 32 in the illustrated embodiment corresponds to the thickness of the inner or outer plate 21, 22.

Provided in the center of the carrier 30 is a substantially cylindrical projection 35 which forms a part of a pivot connection which will be described in greater detail hereinafter. The abutment elements 33 have pin-shaped retaining elements 36. At their free end the retaining elements 36 have a conically tapering portion 37 with a shoulder 38. The pin-shaped retaining elements 36 are divided as considered in their longitudinal direction and are arranged at a spacing relative to each other so that the retaining elements can be compressed and spring back into their original shape when they are released. For that purpose the retaining elements 36 comprise a spring-resilient material. The connecting portion 28 is made from a plastics material.

FIGS. 14 and 15 show a second connecting portion 29 which is complementary to the connecting portion 28. The structure in principle of the connecting portion 29 corresponds to the structure of the connecting portion 28. The connecting portion 29 has a carrier 31 which is of a disc-like configuration. Positioning elements 39 are provided on the circumference of a circle in mutually symmetrical relationship. The positioning elements are of an arcuate configuration. They are of an outside contour which substantially corresponds to the inside contour of the openings 7, 8. The connecting portion 29 also has abutment elements 40 which are substantially of a contour corresponding to the positioning elements 39, with the abutment elements only partially extending in the longitudinal direction of the positioning elements 39. The abutment elements 40 are in the form of a hollow body. They have a cover surface 42 in which a respective through bore 43 is formed. The abutment element 40 which is in the form of a hollow body has a receiving means 44. The cross-section of the through bore 43 substantially corresponds to the cross-section of a shank 45 of the pin-shaped retaining element 36. Provided in the center of the carrier 31 is a substantially tubular projection 46 whose internal cross-section substantially corresponds to the external cross-section of the projection 35 of the connecting portion 28.

FIG. 17 shows the connecting portions 28, 29 in the non-connected and the connected conditions. For the sake of clarity of the drawing chain link portions are not shown. The connecting portions 28, 29 are moved towards each other in such a way that the projection 35 of the connecting portion 28 extends into the projection 46 of the connecting portion 29. The projections 35, 46 form a pivot pin 47. In the assembled condition the abutment elements 33, 40 bear against each other. The individual retaining elements 36 project into the individual receiving means 44 of the connecting portion 49. In that situation the shoulder 38 of each retaining element 36 comes to bear against an inside surface of the receiving means 44. When the individual retaining elements 36 pass through the through bores 43 in an abutment element 40, the retaining elements are compressed. When the portion 37 of the retaining element 36 has reached the receiving means 44 the retaining element 36 springs open whereby the shoulder 38 comes to bear against the wall of the receiving means 44. The connecting portions 28, 29 are releasably connected together.

A co-operation of the connecting portions 28, 29 with chain link portions is illustrated in FIGS. 18, 19 and 20. FIG. 20 shows in the upper part thereof the co-operation of the connecting portion 28 with the inner plate 21. The positioning elements 32 of the connecting portion 28 project into the openings 7 in the inner plate 22. It will be seen from FIG. 20 that the height of the positioning elements substantially corresponds to the thickness of the inner plate 21. The projection 35 of the connecting portion 28 extends through the pivot bore 2. The abutment elements 33 extend through the openings 7 and project.

The lower part of the view in FIG. 20 shows an outer plate 22 with the connecting portion 29. The positioning elements 39 of the connecting portion 29 project into the opening 7 in the outer plate 22. The projection 46 projects through the pivot bore 2 in the outer plate 22. The abutment elements 40 extend through the outer plate 22.

FIG. 19 shows the connection of the inner and outer plate 21, 22 to the chain link portion 9. The inner plate 21 and the outer plate 22 in that situation form a chain link portion 48. As can be seen from FIG. 19 the abutment elements 33, 40 partially project into the opening 8 in the chain link portion 9. The connecting portions 28, 29 are connected together by way of the retaining elements 36 and the receiving means 44. The projections 35, 46 form a pivot pin 47. The height of the abutment elements 33, 40 is such that in the assembled condition the inner plate 21 and the outer plate 22 bear against the chain link portion 29. FIG. 19 also shows that the spacer portions 27 of the inner plate 21 and the outer plate 22 bear against each other. The chain link portion 48 and the chain link portion 9 are pivotable relative to each other about the pivot pin 47. The connecting portions 28, 29 are stationarily connected to the inner plate 21 and the outer plate 22 respectively.

Figure 21:
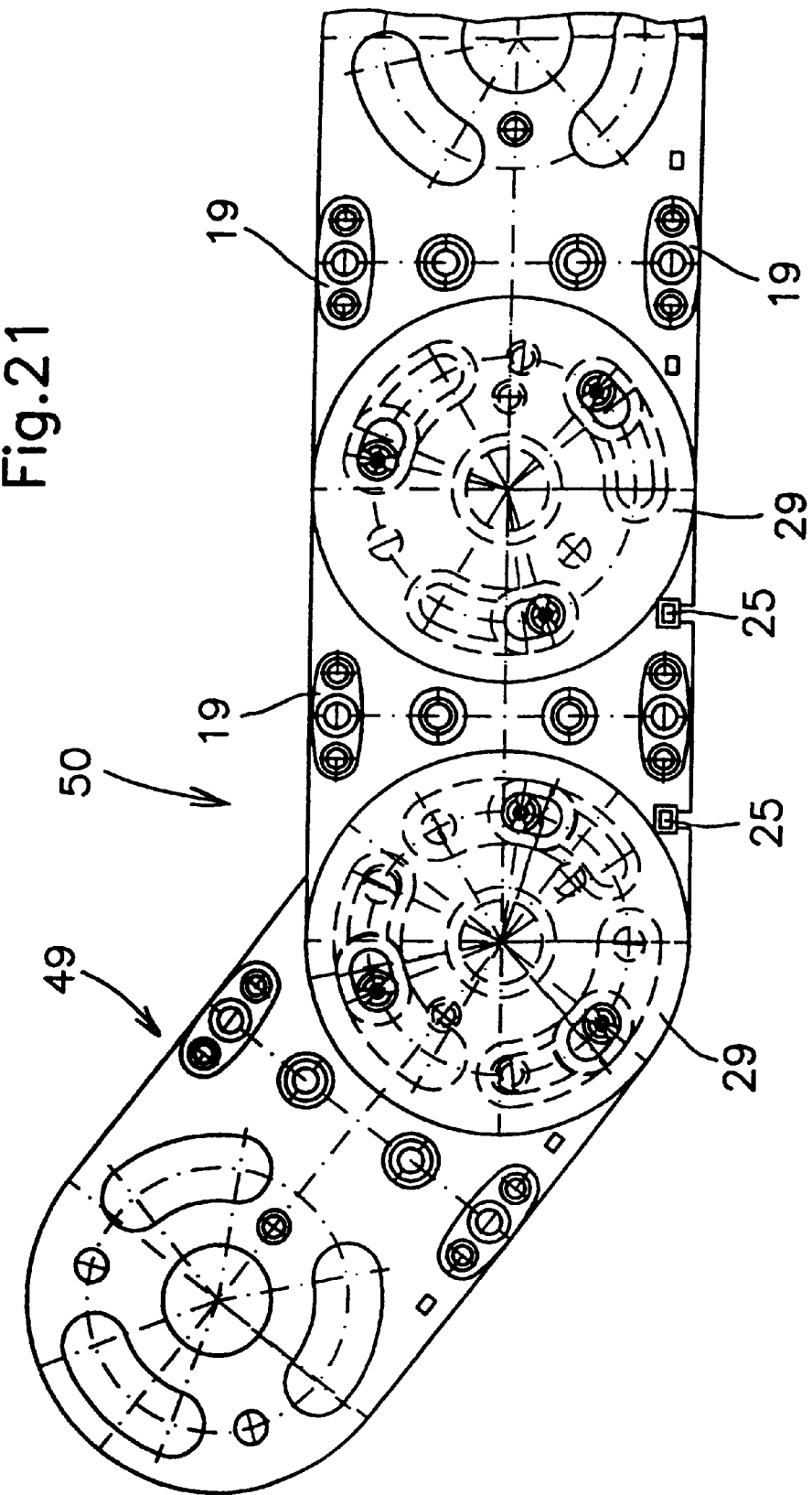
FIG. 21 shows a part of an energy guide chain.

FIG. 21 is a front view of a part of an energy guide chain. The individual chain link portions of the energy guide chain are connected together by the connecting portions. FIG. 21 shows that a chain link 49 is pivoted relative to its adjacent chain link 50. The angle of pivotal movement between two adjacent chain links 49, 50 is determined by a difference between the length of the opening 8 in the peripheral direction and the abutment element 40 in the peripheral direction.

Figure 22:
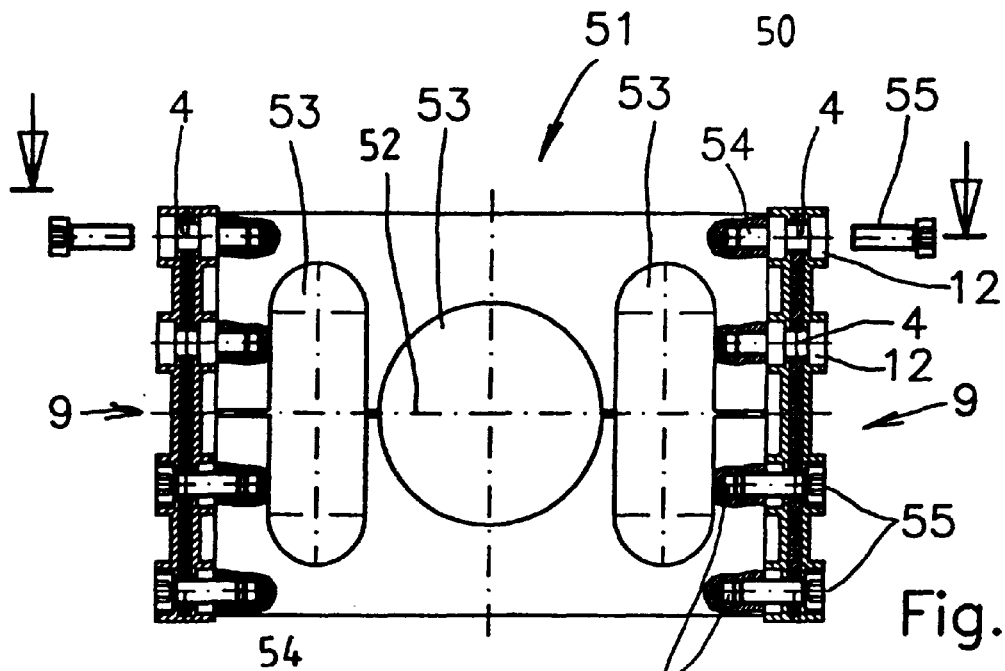
FIG. 22 shows a view in section of a chain link with a transverse portion.
Figure 23:
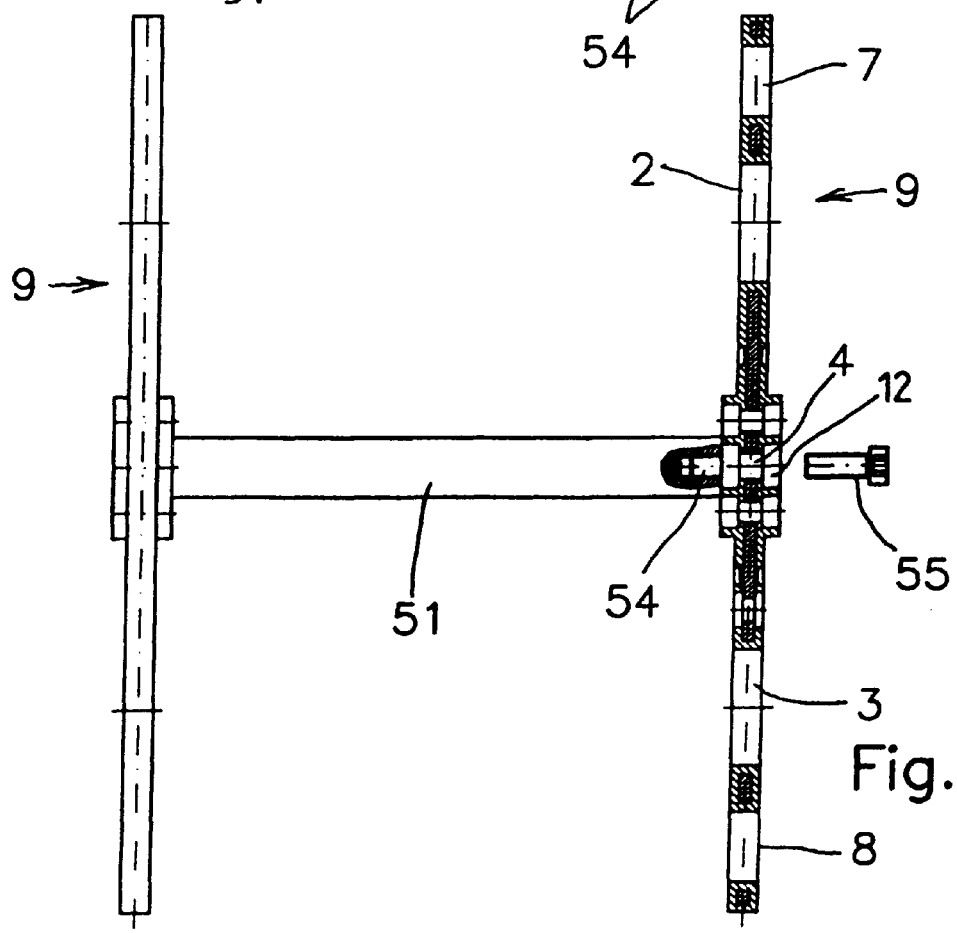
FIG. 23 is a plan view partly in section of the chain link shown in FIG. 22.

FIGS. 22 and 23 show a chain link 50 of an energy guide chain. The chain link 50 includes two chain link portions 9 which are arranged at a spacing relative to each other. The chain link portions 9 are connected together by a transverse portion 51. The transverse portion 51 is in the form of an apertured web portion. It is in two parts, wherein the division plane 52 extends substantially perpendicularly to a longitudinal plane of the chain link portions 9. The transverse portion 51 has receiving openings 53, which serve to receive lines (not shown). For the connection of the transverse portion 51 to the chain link portions 9 the transverse portion has screwthreaded bores 54 into which screws 55 can be screwed. The screws 55 extend through the bores 4, which are respectively provided in the chain link portion 9. The head of each screw is sunk in the head space 12 in the assembled condition.

The embodiment of a transverse portion which is illustrated in FIGS. 22 and 23 represents an example of a transverse portion. A transverse portion 51 can also be in the form of a cover portion. The connection of such a transverse portion is made by way of a screw connection, with the screws then extending through the bores 5 of the chain link portion.

Figure 24:
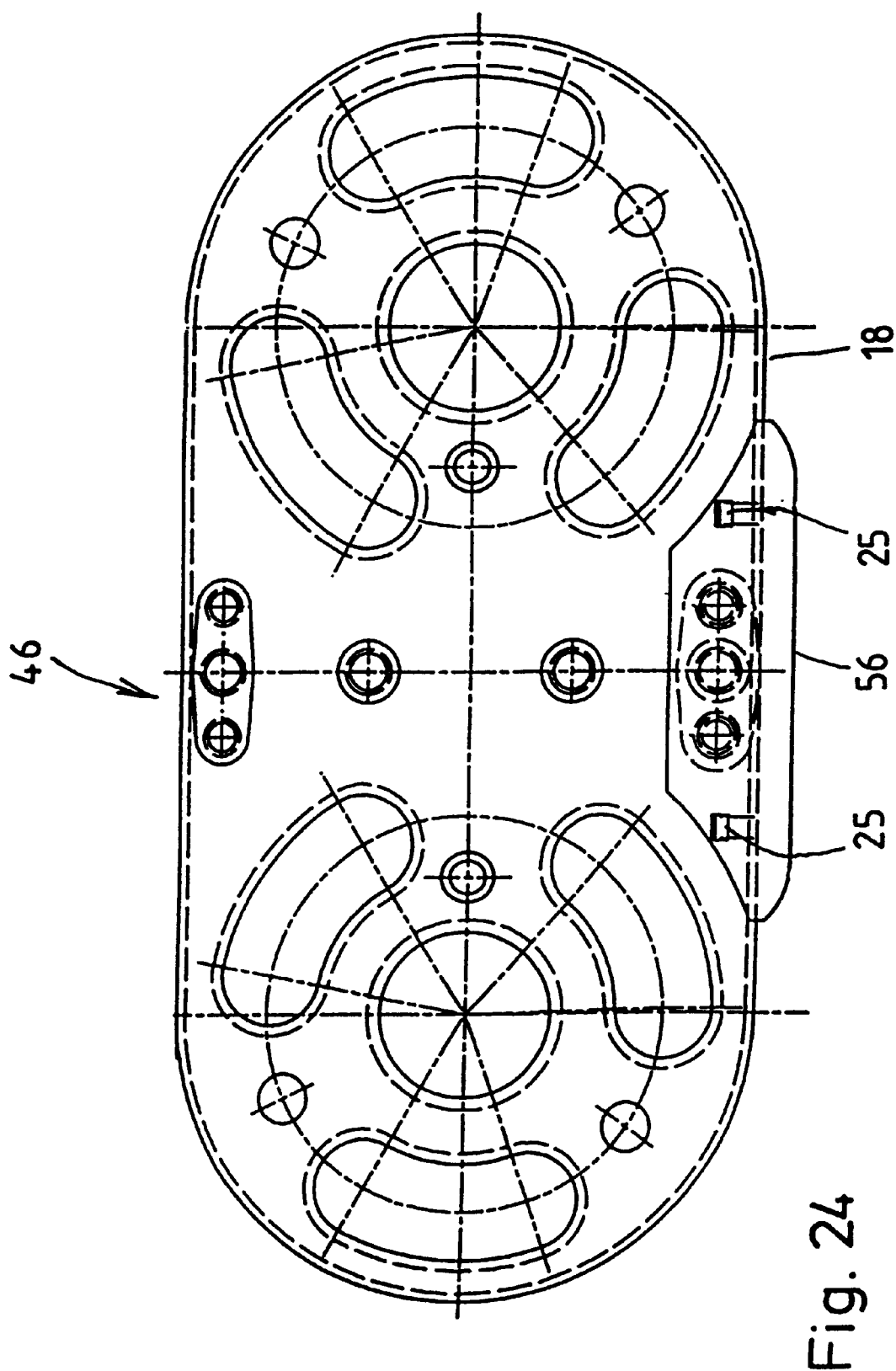
FIG. 24 shows a chain link with a sliding shoe.

During operation of an energy guide chain a longitudinal edge of the chain link portions slides on a support structure. The chain links suffer from wear due to friction between the longitudinal edge and the support structure. Furthermore frictional losses occur due to the forces which are produced during the movement of the energy guide chain. To reduce the frictional losses and the amount of wear it is proposed that a slide shoe 56 is arranged on a longitudinal edge 18, as is illustrated in FIG. 24. The holders 25 and the recesses 14' serve to connect the slide shoe 56 to a chain link portion 48, as will be apparent from FIGS. 18 and 19. The slide shoe 56 has suitable recess configurations so that a latching connection is made between the chain link portion 48 and the slide shoe 56.

What is claimed is:

1. A chain link for an energy guide chains for guiding supply lines, comprising two spaced-apart, mutually oppositely disposed chain link portions and at least one transverse portion connected to the chain link portions, wherein at least one chain link portion has a core and a core sheathing which at least partially encloses the core and wherein the core is of higher strength than the core sheathing.

2. A chain link according to claim 1 wherein the core is formed by at least one macroscopic structure which has a high level of mechanical strength.

3. A chain link according to claim 2 wherein the core has a honeycomb structure.

4. A chain link according to claim 1, wherein the core comprises at least a first material which has a higher level of strength and a greater modulus of elasticity in comparison with at least a second material of the core sheathing.

5. A chain link according to claim 4 wherein the core at least partially comprises at least one metallic material.

6. A chain link according to claim 5 wherein the core at least partially comprises a light metal or alloy.

7. A chain link according to claim 6 wherein the core comprises aluminium or an aluminium alloy.

8. A chain link according to claim 5 wherein the core at least partially comprises steel or a steel alloy.

9. A chain link according to claim 4 wherein the core comprises at least a first material which, compared with at least a second material of the core sheathing has a modulus of elasticity which is at least five times as great as at least a second material of the core sheathing.

10. A chain link according to claim 1 wherein the core is of a multi-layer structure.

11. A chain link according to claim 10 wherein the structure is formed by at least two layer portions of different materials.

12. A chain link according to claim 1 wherein the core is in one piece.

13. A chain link according to claim 1 wherein the core is of a plate-like configuration.

14. A chain link according to claim 1 wherein the core sheathing completely encloses the core.

15. A chain link according to claim 1 wherein the core sheathing at least partially comprises at least one plastic material.

16. A chain link according to claim 1 wherein the configuration of the core substantially corresponds to a shape of a chain link portion.

17. A chain link according to claim 1 wherein the core comprises a metallic material and the core sheathing comprises a plastic material.

18. An energy guide chain comprising a plurality of chain links, with at least one chain link comprising two spaced-apart, mutually oppositely disposed plate-like chain link portions and at least one transverse portion connected to the chain link portions, wherein at least one of the chain link portions having core and a core sheathing which at least partially encloses the core with the core being of higher strength than the core sheathing, and wherein each chain link portion has two spaced-apart pivot bores which extend transversely with respect to the longitudinal extent of the chain link portion and which are each surrounded by at least one arcuate opening, the chain link portions of adjacent chain links being connected together by at least one connecting portion comprising a plastic material, wherein each connecting portion has at least one positioning element which projects into the opening in a chain link portion and fixes the connecting portion to the chain link portion and at least one abutment element which projects into an opening in a chain link portion of an adjacent chain link and defines an angle of pivotal movement of the adjacent chain links about a common pivot pin which extends through the pivot bores.

19. An energy guide chain according to claim 18 wherein a chain link which has one-piece chain link portions is followed by a chain link whose chain link portions are formed by an inner plate and an outer plate, with the one-piece chain link portion being arranged between the inner and outer plates.

20. An energy guide chain according to claim 19 wherein two connecting portions are provided for connecting adjacent chain link portions, wherein each connecting portion has at least one positioning element which projects into the opening in the inner plate or the outer plate and at least one abutment element which partially projects into the opening in the one-piece chain link portion.

21. An energy guide chain according to claim 20 wherein the connecting portions are preferably releasably latchable to each other.

22. An energy guide chain according to claim 21 wherein the abutment elements of the one connecting portion have receiving means and the abutment elements of the other connecting portion have retaining elements which engage into the receiving means.

* * * * *